US011879612B2

(12) United States Patent
Zhang et al.

(10) Patent No.: US 11,879,612 B2
(45) Date of Patent: Jan. 23, 2024

(54) LIGHT GUIDE, VEHICLE LAMP AND MOTOR VEHICLE

(71) Applicant: VALEO VISION, Bobigny (FR)

(72) Inventors: Jinting Zhang, Wuhan (CN); Mingrui Sun, Wuhan (CN)

(73) Assignee: VALEO VISION, Bobigny (FR)

( * ) Notice: Subject to any disclaimer, the term of this patent is extended or adjusted under 35 U.S.C. 154(b) by 54 days.

(21) Appl. No.: 17/614,445

(22) PCT Filed: May 27, 2020

(86) PCT No.: PCT/EP2020/064616
§ 371 (c)(1),
(2) Date: Nov. 26, 2021

(87) PCT Pub. No.: WO2020/239792
PCT Pub. Date: Dec. 3, 2020

(65) Prior Publication Data

US 2022/0235912 A1 Jul. 28, 2022

(30) Foreign Application Priority Data

May 28, 2019 (CN) ......................... 201920788358.3

(51) Int. Cl.

| | |
|---|---|
| ***F21S 43/237*** | (2018.01) |
| ***F21S 43/247*** | (2018.01) |
| ***F21S 43/245*** | (2018.01) |
| ***F21S 43/241*** | (2018.01) |
| ***F21W 103/20*** | (2018.01) |

(52) U.S. Cl.
CPC ........... *F21S 43/237* (2018.01); *F21S 43/241* (2018.01); *F21S 43/245* (2018.01); *F21S 43/247* (2018.01); *F21W 2103/20* (2018.01)

(58) Field of Classification Search
CPC ...... F21S 43/237; F21S 43/241; F21S 43/245; F21S 43/247
See application file for complete search history.

(56) References Cited

U.S. PATENT DOCUMENTS 9,140,422 B2 * 9/2015 Arrivet ................ B60Q 1/2607

FOREIGN PATENT DOCUMENTS

| | | | |
|---|---|---|---|
| JP | 2016-119283 | A | 6/2016 |
| JP | 2016-152142 | A | 8/2016 |
| JP | 2017-195047 | A | 10/2017 |
| JP | 2017-224445 | A | 12/2017 |
| WO | WO 2018/180352 | A1 | 10/2018 |

OTHER PUBLICATIONS

International Search Report dated Jul. 24, 2020 in PCT/EP2020/064616 filed May 27, 2020, 4 pages.

* cited by examiner

*Primary Examiner* — Thomas M Sember
(74) *Attorney, Agent, or Firm* — Oblon, McClelland, Maier & Neustadt, L.L.P.

(57) ABSTRACT

A light guide, and a vehicle lamp and motor vehicle including the light guide, which is configured to be installed in an opening defined by a lamp frame of a vehicle lamp. The light guide includes an elongated body, the body having a light exit segment for guiding light from a light source to exit in a target direction, the light exit segment including a bend segment. The light guide further includes a wing-like part, the wing-like part being at least connected to the bend segment and being configured to fill a gap between the bend segment and an edge of the opening.

16 Claims, 6 Drawing Sheets

LIGHT GUIDE, VEHICLE LAMP AND MOTOR VEHICLE

TECHNICAL FIELD

The embodiments of the present invention relate generally to the field of lighting or signal indication, in particular to a light guide, and a vehicle lamp and motor vehicle having the light guide.

BACKGROUND ART

In various fields, many types of lighting or signal indication devices are known for the purpose of providing light for lighting or signal indication. For example, vehicle lamps are used in motor vehicles to provide lighting or signal indication functions, in order to ensure safe driving or provide an ornamental function.

Light guide, as a type of optical element, is often used in vehicle lamps of motor vehicles to guide light from a light source to a required position. In this case, total reflection and transmission effects of light inside a light guide are generally utilized. The design of vehicle lamps involves the fixing and installation of light guides. For example, when a light guide is used in a motor vehicle or another machine, there is generally limited installation space. The geometric dimensions of such installation space are variable or different at different positions, e.g. some positions are wider, while some positions are narrower. As a result, the light guide cannot be accommodated appropriately at one or more positions of the installation space; it is necessary for the light guide to change shape, e.g. by bending, but this will adversely affect the light exit effect of the light guide, e.g. causing undesired light leakage. Moreover, for the sake of the demand for filled-out styling, the light guide diameter is generally increased in conventional technology, but this will not be favourable for light guide design and manufacture, and will increase costs.

SUMMARY OF THE INVENTION

An object of the present invention is to overcome or eliminate at least one of the problems and shortcomings in the prior art.

According to one aspect of the present invention, an embodiment provides a light guide for installation in an opening defined by a lamp frame of a vehicle lamp;

the light guide comprises an elongated body, the body having a light exit segment for guiding light from a light source to exit in a target direction, the light exit segment comprising a bend segment, and the light guide further comprises a wing-like part, the wing-like part being at least connected to the bend segment and being configured to fill a gap between the bend segment and an edge of the opening.

In some embodiments, the wing-like part is joined to a non-light-exit side of the bend segment, and is oriented to emit light in substantially the same direction as the target direction.

In some embodiments, the wing-like part has a light exit surface and a back surface opposite the light exit surface, the back surface being provided with a light extraction structure, the light extraction structure being configured to guide light propagated in the wing-like part to exit from the light exit surface.

In some embodiments, the light extraction structure comprises at least one of a prismatic structure, a tooth-like structure, a groove and a depression.

In some embodiments, the light guide further comprises two wing-like parts located at two opposite sides of the bend segment respectively.

In some embodiments, the wing-like part has a substantially flat contour extending outwards from the bend segment.

In some embodiments, the wing-like part and the bend segment form an integral structure.

In some embodiments, the light guide further comprises a fixing part, the fixing part being connected to a side of the wing-like part which is away from the body to fix the light guide to the lamp frame.

In some embodiments, the fixing part is adapted to be positioned at an inner side of the lamp frame, such that when viewed against a light exit direction of the body, the fixing part is not visible.

In some embodiments, the light exit segment has a substantially constant cross-sectional size.

In some embodiments, the body also has a first end and second end opposite each other, at least one of the first and second end being defined with a light entry surface, the light entry surface being configured to receive light from the light source, such that the received light is propagated in the body to the light exit segment.

In some embodiments, the body comprises one tubular or rod-like light guide element, or comprises at least two tubular or rod-like light guide elements arranged side by side.

According to another aspect of the present invention, an embodiment provides a vehicle lamp, comprising: a lamp frame, the lamp frame defining an outer contour of the vehicle lamp and having an opening; a light source; and the light guide described in any embodiment of the present invention, at least a part of the light guide being installed in the opening, and the light guide being configured to receive light from the light source and guide the received light to exit in a target direction.

According to another aspect of the present invention, an embodiment further provides a motor vehicle, comprising the light guide or vehicle lamp described in any embodiment of the present invention.

The following detailed description of the present invention with reference to the drawings will make other objects and advantages of the present invention obvious, and can help to provide a comprehensive understanding of the present invention.

BRIEF DESCRIPTION OF THE DRAWINGS

These and/or other aspects, features and advantages of the present invention will become obvious and easy to understand through the following description of illustrative embodiments in conjunction with the drawings, wherein.

DETAILED DESCRIPTION OF EMBODIMENTS

Embodiments of the present invention are described in detail below in conjunction with the drawings. In this specification, functionally identical or similar components are indicated by identical reference signs. The following explanation of exemplary embodiments of the present invention with reference to the drawings is intended to expound the invention concept of this disclosure, and should not be interpreted as a limitation of the present invention.

Furthermore, in the detailed description below, to facilitate explanation, many specific details are expounded in order to provide a comprehensive understanding of embodiments of the present invention. However, it is obvious that one or more embodiments could also be implemented without these specific details. In other cases, well-known structures and apparatuses are embodied as pictures in order to simplify the accompanying drawings.

Figure 1:
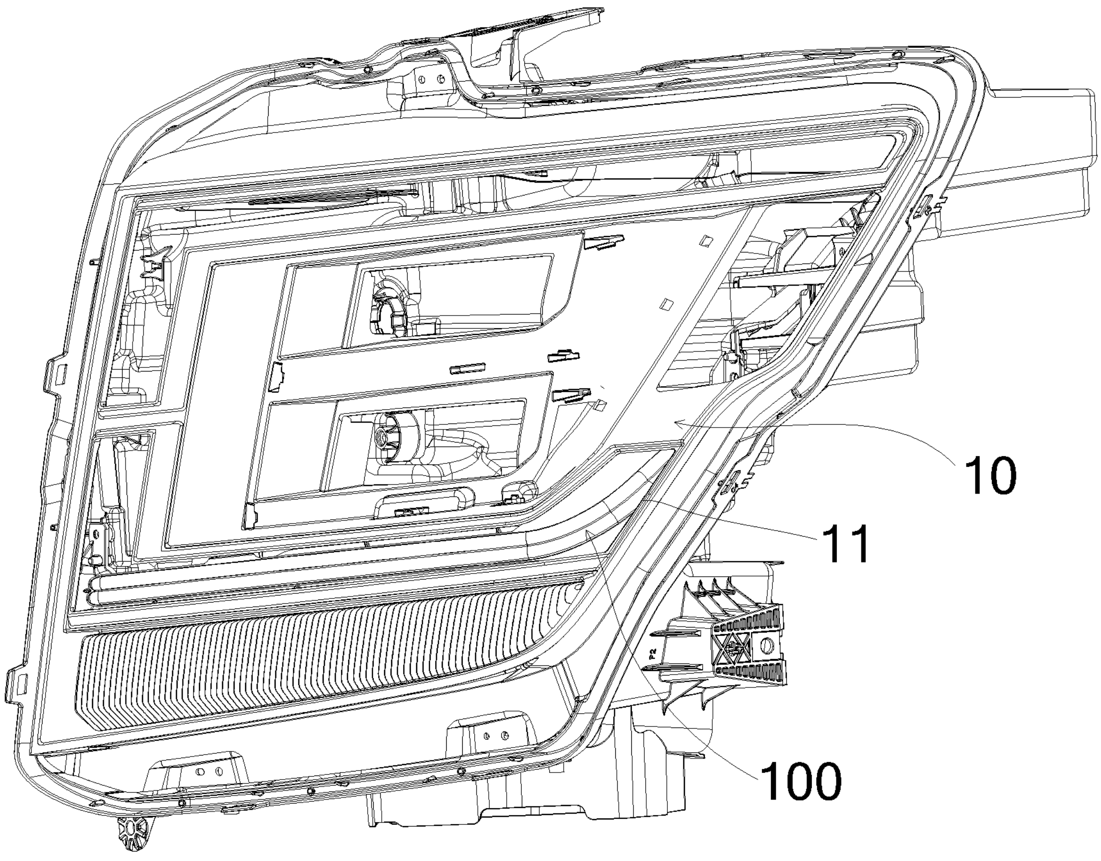
FIG. 1 is a perspective view of part of the structure of a vehicle lamp according to an exemplary embodiment of the present invention.
Figure 2:
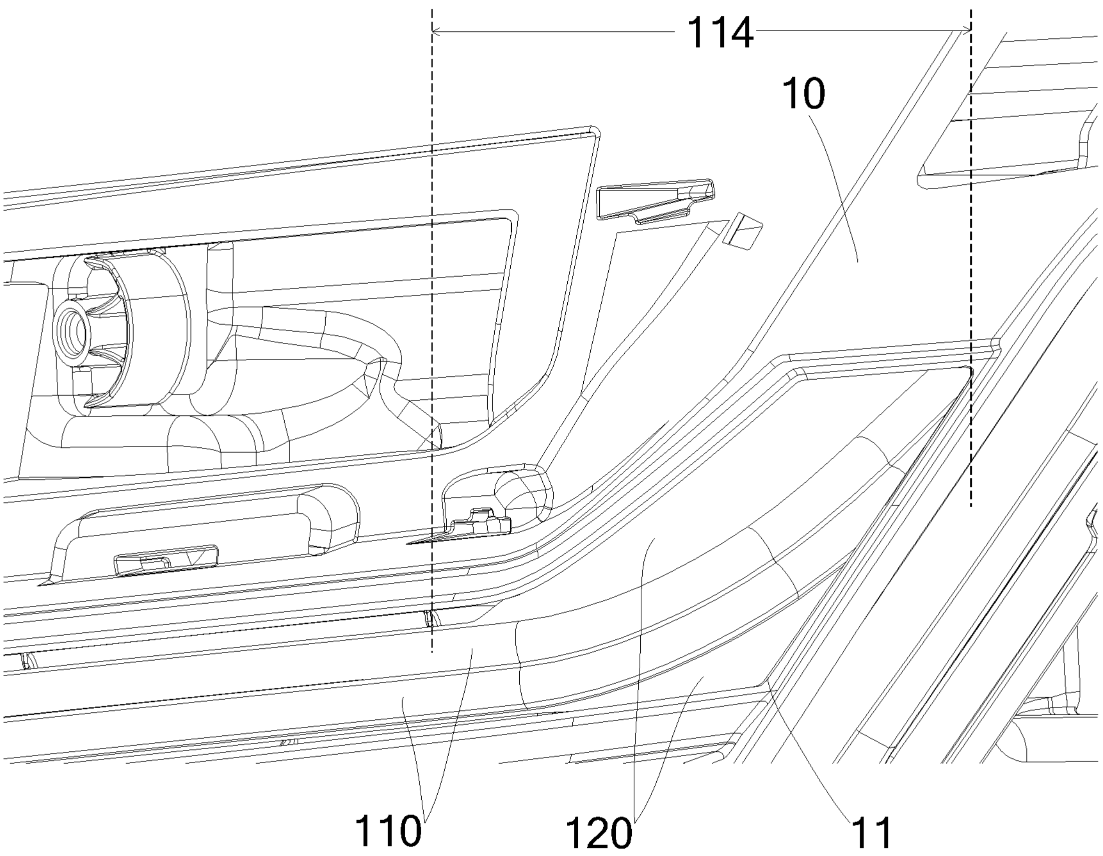
FIG. 2 is a partial enlarged view of the vehicle lamp in FIG. 1.

FIGS. 1 and 2 show schematically a structure of a vehicle lamp according to an exemplary embodiment of the present invention. The vehicle lamp 1 uses a light guide 100 to realize a lighting or signal indication function, for example, including but not limited to providing a function such as a daytime running lamp, position lamp or tail lamp. The vehicle lamp 1 comprises a lamp frame 10 defining an outer contour thereof, such as an ornamental frame or a bezel, and the light guide 100 is at least partially installed in an opening 11 or groove defined by the lamp frame 10. The vehicle lamp 1 further comprises a light source 13 (see FIG. 4), such as an LED light source. The light guide 100 receives light from the light source 13 and guides the received light to exit from the vehicle lamp in a target direction.

As vehicle lamp technology develops, more and more motor vehicles are not satisfied with simply providing a lighting function; instead, it is hoped to obtain better vehicle lamp light-up effects, e.g. it is hoped that certain specially shaped styling elements can be clearly displayed (e.g. C shapes, L shapes or other bend shapes). Thus, light guide elements are not always straight, but need to change shape or bend, so as to adapt to changes in extension from the light source to the installation position, or provide desired light-up styling.

FIGS. 1-4 show the structure of a light guide according to an exemplary embodiment of the present invention. As shown in the figures, the light guide 100 has a bend contour, to adapt to the shape of the opening 11 defined by the lamp frame 10. In order to present desired styling, it might be hoped that the light guide extends from the light source in multiple bend shapes, but as those skilled in the art will understand, the bend contour of the light guide has a limitation in terms of minimum radius of curvature. If the radius of curvature of the light guide is too small, i.e. the bending is too large, then reflection (such as total reflection) of light in the light guide will be altered or disrupted, with the result that light exits or leaks in an undesired direction from the position of bending of the light guide or the vicinity thereof, and the light-up effect is impaired, e.g. having dark zones. Thus, it is necessary to improve the light exit effect of the light guide at the position of bending. Some conventional technologies change the diameter of the light guide, but this will increase the difficulty and cost of light guide manufacturing.

In the embodiment shown, the light guide 100 comprises an elongated body 110. The body 110 has a first end 111 and a second end 112 opposite each other, and a light exit segment 113 extending between the first end 111 and the second end 112. The light exit segment 113 is used to guide light from the light source 13 to exit from the vehicle lamp in a target direction, thereby providing a desired light-up styling, lighting or signal indication function. In some examples, as shown in FIGS. 1-5, the body 110 may comprise one tubular or rod-like light guide element, or comprise at least two tubular or rod-like light guide elements arranged side by side, such as light guide tube or light guide rod. Two light guide elements may be spaced apart from one another or integrally connected.

Figure 4:
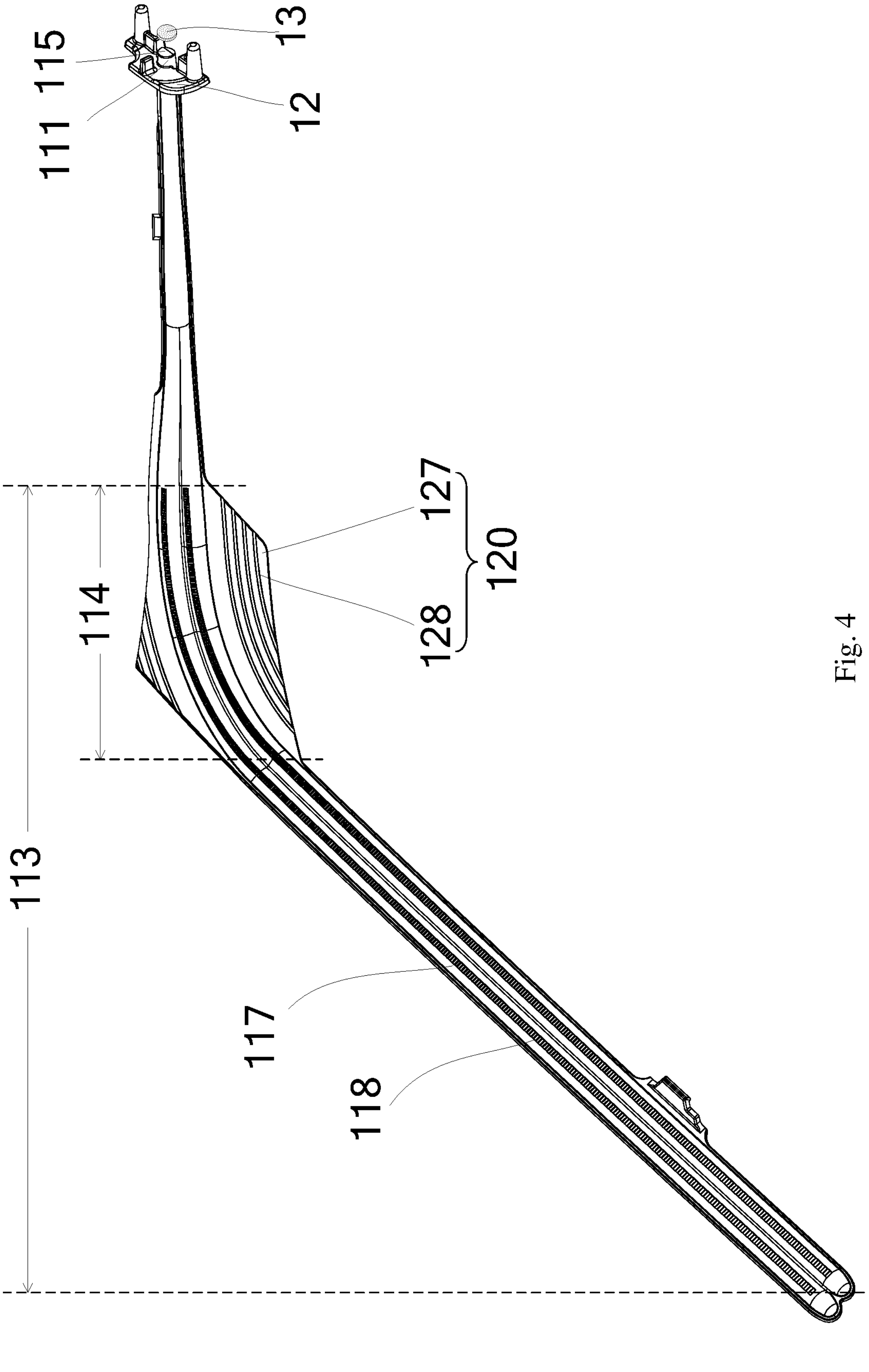
FIG. 4 is a rear perspective view which shows schematically the structure of a light guide according to an exemplary embodiment of the present invention.

At least one of the first end 111 and second end 112 of the body 110 may be defined with a light entry surface, the light source being arranged close to the light entry surface to emit light towards the light guide. As shown in FIG. 4, the first end 111 has a light entry surface 115 or a light coupling-in surface, the light entry surface or light coupling-in surface being used for receiving light from the light source 13, such that the received light is propagated in the body 110 to the light exit segment 113. The first end 111 close to the light source 13 may be supported by a support 12 or fixed to the lamp frame or fixed relative to the light source, such that more stable light coupling is provided between the light source and the light entry surface of the light guide. In other examples, a corresponding light source may be disposed at or near each end of the body, to provide enhanced intensity and/or uniformity of exit light.

As shown in FIGS. 3-6, the light exit segment 113 has a light exit surface 116 for emitting light in a target direction and a back surface 117 opposite the light exit surface 116, the back surface 117 being provided with a light extraction structure 118 (also called a light decoupling structure), and this is used to cause the exit from the light exit surface 116 of at least a portion of light propagating inside the light exit segment 113. As those skilled in the art will understand, the light extraction structure or light decoupling structure alters or destroys the conditions for propagation of light in the light guide, e.g. alters or destroys the conditions for totally reflected propagation of light in the light guide, such that light finally exits from the designated light exit surface of the light guide (such an effect may be called a light decoupling effect). As examples of light extraction structures or light decoupling structures, various optical microstructures may be included, including but not limited to prism or prismatic structures, tooth-like structures, grooves, depressions, protrusions, etc.

At least one part of the body 110 extending between the first end 111 and the second end 112 forms the light exit segment 113, e.g. a part away from the light source 13 forms the light exit segment. As shown in FIGS. 1-4, the light exit segment 113 has a bend contour, i.e. has a bend segment 114, for example having substantially the same shape as the opening 11 of the lamp frame 10. Due to this bend contour of the light exit segment and possible deviation or deformation during assembly, the light exit effect thereof at the bend segment will be impaired, e.g. with a light exit intensity or area that differs from that at other positions to a greater or lesser extent.

According to an embodiment of the present invention, the light guide 100 further comprises a structure which provides an auxiliary light exit function at the bend segment, e.g. a wing-like part 120 as shown in the drawings. As shown in FIGS. 1 and 2, the shape and/or dimensions of the wing-like part 120 may be configured to fully or partially fill a gap between the bend segment 114 and an edge of the opening 11, and can emit light to the outside just like the light exit segment 113. For example, the wing-like part 120 may be oriented to emit light in substantially the same direction as a light exit direction of the light exit segment 113 or the bend segment 114 thereof, thereby improving the light exit effect in the vicinity of the bend segment, avoiding a dark zone or undesired light leakage due to the bend, and also being able to provide satisfactory light-up styling.

The wing-like part 120 may be connected to the bend segment 114, e.g. joined to a non-light-exit side of the bend segment 114. In some examples, the wing-like part 120 may be formed as an integral structure with the bend segment 114 or the light exit segment 113, e.g. made of the same material, e.g. made or injection-moulded from many kinds of transparent or translucent materials with suitable optical properties; these materials include polycarbonate (PC), polyacrylate (e.g. poly(methyl methacrylate) (PMMA)), poly (propylene/ethylene) (PPE), glass and other plastics having a high refractive index. In some embodiments, as shown in FIGS. 1-6, the wing-like part 120 may have a substantially flat contour extending outwards from the bend segment 114. In addition, the light guide 100 may comprise two wing-like parts 120 located on two opposite sides of the bend segment 114 respectively, in order to better or more completely fill the gap between the bend segment 114 and the edge of the opening 11. Of course, the wing-like part may also be located at one side of the bend segment 114.

Figure 5:
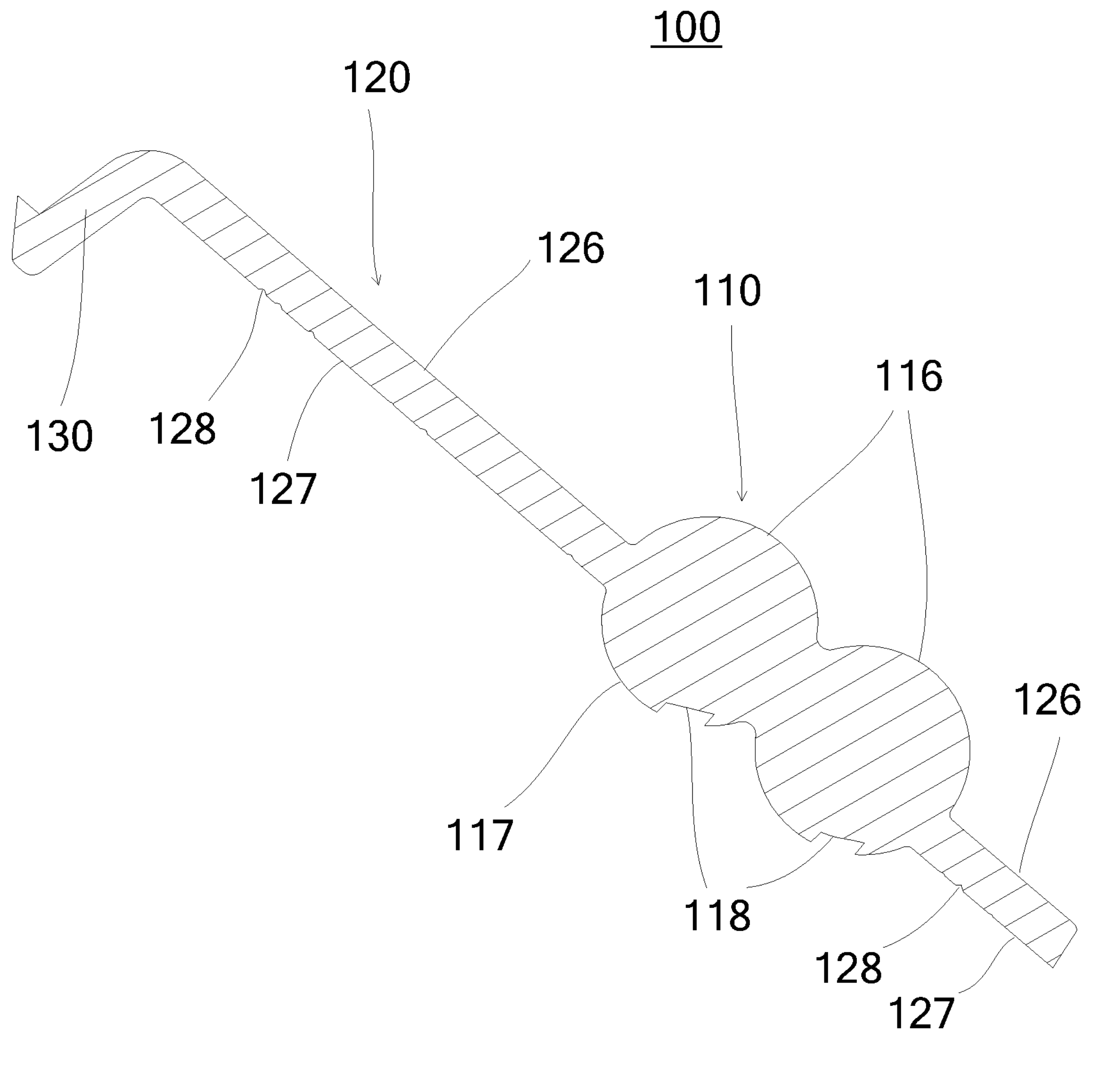
FIG. 5 is a sectional view, taken along line A-A' in FIG. 3, showing the structure of a light guide according to an exemplary embodiment of the present invention.
Figure 6:
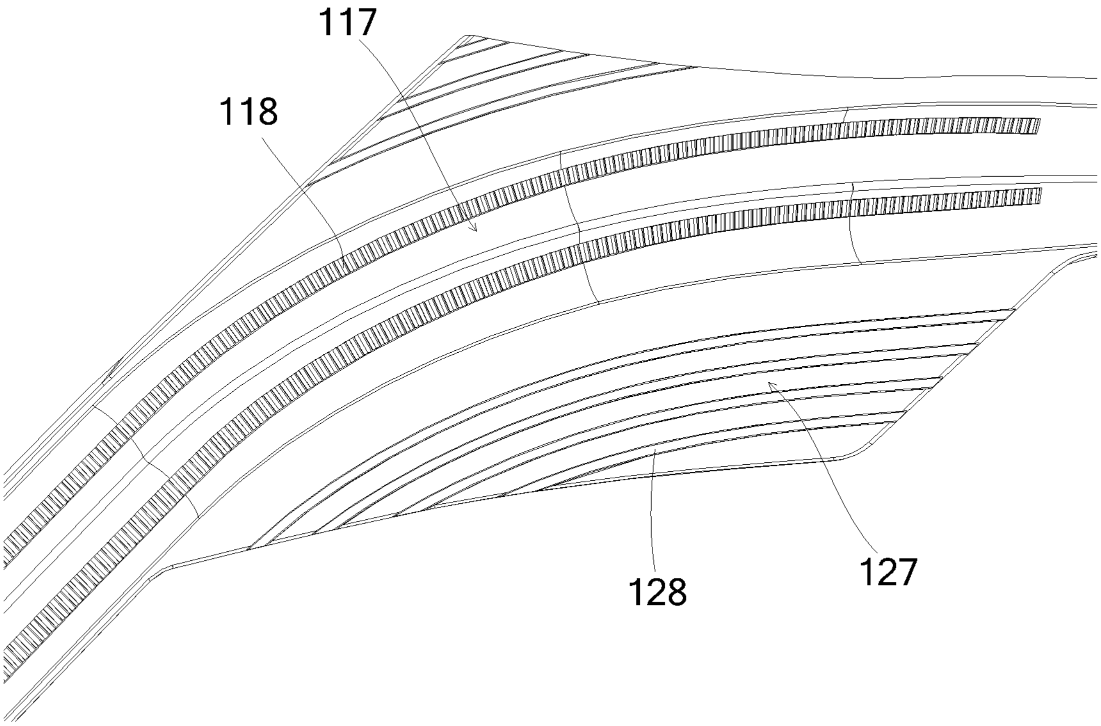
FIG. 6 is a partial enlarged view of the light guide shown in FIG. 4.
Figure 7:
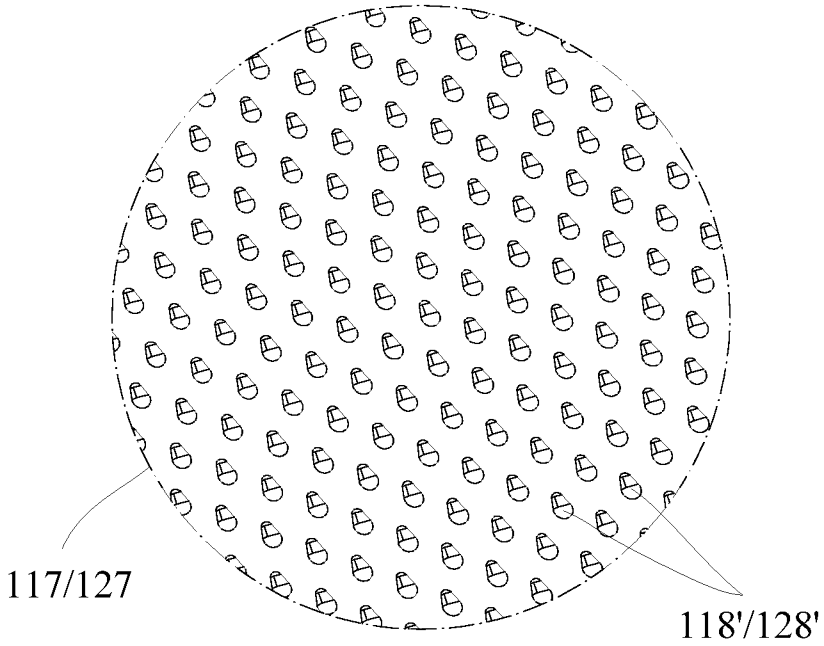
FIG. 7 is an enlarged view showing a light extraction structure of a light guide according to an exemplary embodiment of the present invention.

Light propagated in the body 110 can enter the wing-like part 120, and exit from a light exit surface 126 (see FIG. 5) of the wing-like part 120. As shown in FIGS. 4-6, the wing-like part 120 also has a back surface 127 opposite the light exit surface 126, and the back surface 127 may likewise be provided with a light extraction structure 128 or a similar optical structure, which is used for guiding light propagated in the wing-like part 120 to exit from the light exit surface 126, e.g. to emit light in substantially the same direction as the light exit direction of the light exit segment 113 or the bend segment 114 thereof. The light extraction structure 128 may also comprise various optical microstructures, including but not limited to prism or prismatic structures, tooth-like structures, grooves, depressions, protrusions, etc. In some examples, as shown in FIGS. 4 and 6, the light extraction structure 128 takes the form of elongated grooves extending on the back surface 127 of the wing-like part 120. FIG. 7 shows another form of light extraction structure 118', 128', comprising multiple micro-grooves or depressions, which are distributed, e.g. uniformly distributed, on the corresponding back surface 117, 127.

Figure 3:
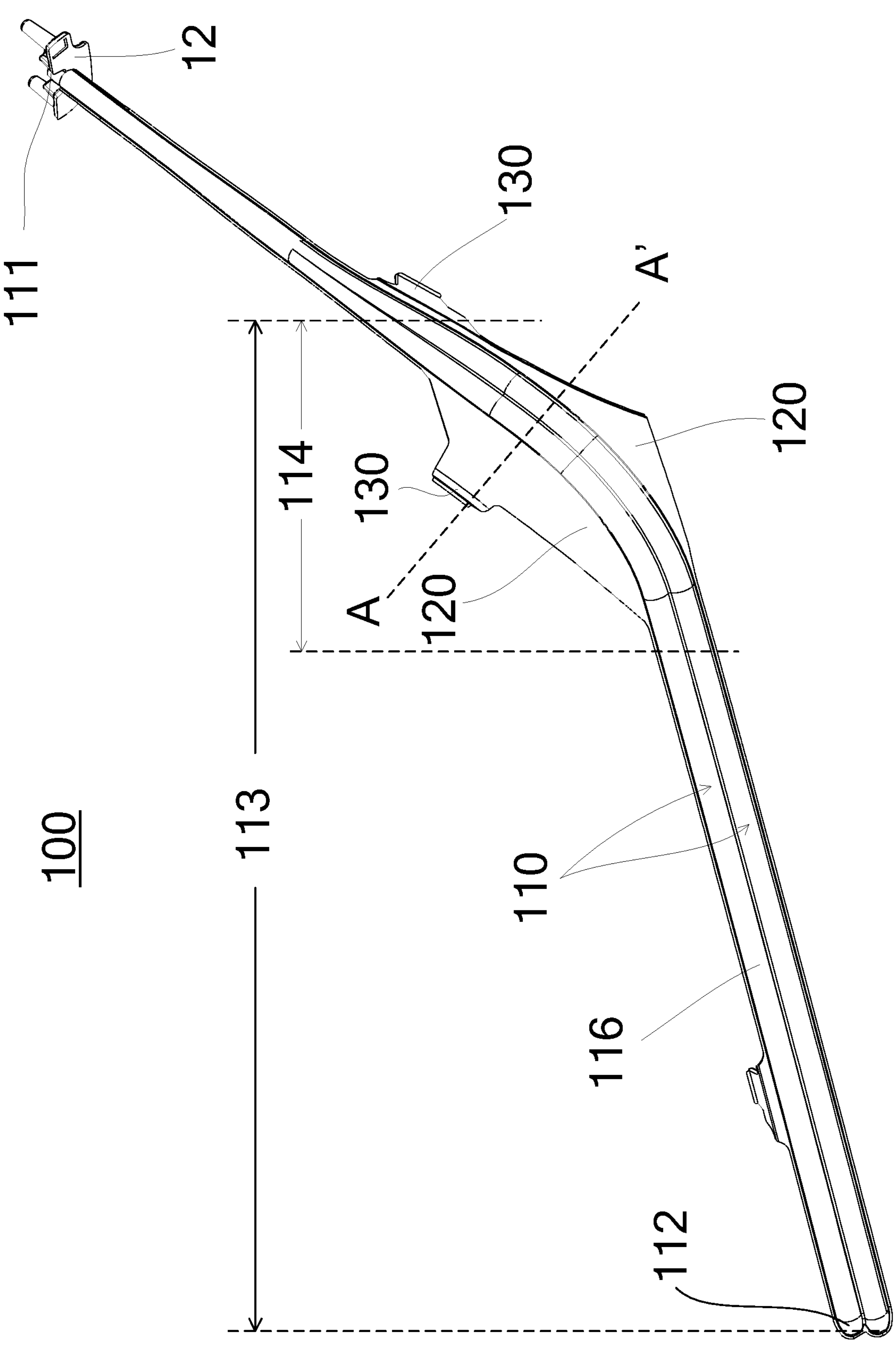
FIG. 3 is a front perspective view which shows schematically the structure of a light guide according to an exemplary embodiment of the present invention.

According to an embodiment of the present invention, as shown in FIGS. 3 and 5, the light guide 100 may also comprise a fixing part 130, which is connected to a side of the wing-like part 120 away from the body 110, to fix the light guide to the lamp frame 10 or another component. Compared with conventional technology in which a fixing element is used to directly connect and fix a light guide body, the fixing part of the light guide according to the present invention is positioned away from the body, and it is thereby possible to avoid hot spots or bright spots, which might be caused by the fixing part or fixing element directly clamping or connecting the light guide body. The fixing part may take any suitable form, e.g. a hooked flange, clip or snap-fit connector, etc.

In an embodiment of the present invention, due to the fact that the fixing part 130 is connected to that side of the wing-like part 120 which is away from the body 110, and the wing-like part 120 fills the gap between the bend segment 114 and the edge of the opening 11, the fixing part 130 can be positioned at an inner side of the lamp frame 10. Thus, when viewed against the light exit direction of the light guide 100, the fixing part 130 is not visible (as shown in FIGS. 1 and 2), so a better aesthetic effect is provided.

As stated above, the light guide comprises a structure which provides an auxiliary light exit function at the bend segment thereof, e.g. the above-mentioned wing-like part; thus, according to an exemplary embodiment of the present invention, the light exit segment of the light guide can have a substantially constant cross-sectional size, with no need to use a complex variable cross section profile, so costs are lowered. For example, the light guide may employ a light guide having a conventional size, e.g. a light guide of diameter 6 mm, 8 mm or 10 mm.

The above-mentioned light guide provided in an embodiment of the present invention may be used in various types of vehicle lamp. The vehicle lamp may comprise a lamp frame, a light source and the light guide described above, with the light guide being installed in an opening of the lamp frame, to guide light from the light source to exit in a target direction. Exemplarily, the vehicle lamp may comprise a motor vehicle daytime running lamp, direction indicator lamp, position lamp or tail lamp, etc., or may comprise various types of in-vehicle ornamental lamps or illumination lamps.

An embodiment of the present invention further provides a motor vehicle comprising a light guide or a vehicle lamp according to any one of the embodiments described above.

Although the present invention has been explained in conjunction with the drawings, the embodiments disclosed in the drawings are intended to provide an exemplary illustration of preferred embodiments of the present invention, and must not be interpreted as a limitation of the present invention. The dimensional proportions in the drawings are merely schematic, and must not be interpreted as a limitation of the present invention.

Although some embodiments of the overall concept of the present invention have been shown and explained, those skilled in the art will understand that changes may be made to these embodiments without departing from the overall invention concept. The scope of the present invention is defined by the claims and their equivalents.

The invention claimed is:

1. Light guide for installation in an opening defined by a lamp frame of a vehicle lamp, wherein the light guide comprises:

an elongated body, the body having a light exit segment for guiding light from a light source to exit in a target direction, the light exit segment comprising a bend segment; and a wing-like part, the wing-like part being at least connected to the bend segment and being configured to fill a gap between the bend segment and an edge of the opening, wherein the wing-like part:

is joined to a non-light-exit side of the bend segment and is oriented to emit light in substantially the same direction as the target direction, and has a light exit surface and a back surface opposite the light exit surface, the back surface being provided with a light extraction structure, the light extraction structure being configured to guide light propagated in the wing-like part to exit from the light exit surface.

2. Light guide according to claim 1, wherein the light extraction structure comprises at least one of a prismatic structure, a tooth-like structure, a groove and a depression.

3. Light guide according to claim 1, wherein the light guide further comprises an additional wing-like part, wherein the wing-like part and the additional wing-like part are located at two opposite sides of the bend segment respectively.

4. Light guide according to claim 1, wherein the wing-like part has a substantially flat contour extending outwards from the bend segment.

5. Light guide according to claim 1, wherein the wing-like part and the bend segment form an integral structure.

6. Light guide according to claim 1, wherein the light guide further comprises a fixing part, the fixing part being connected to a side of the wing-like part which is away from the body to fix the light guide to the lamp frame.

7. Light guide according to claim 6, wherein the fixing part is adapted to be positioned at an inner side of the lamp frame, such that when viewed against a light exit direction of the body, the fixing part is not visible.

8. Light guide according to claim 1, wherein the light exit segment has a substantially constant cross-sectional size.

9. Light guide according to claim 1, wherein the body also has a first end and a second end opposite each other, at least one of the first and second end being defined with a light entry surface, the light entry surface being configured to receive light from the light source, such that the received light is propagated in the body to the light exit segment.

10. Light guide according to claim 1, wherein the body comprises one tubular or rod-like light guide element, or comprises at least two tubular or rod-like light guide elements arranged side by side.

11. Vehicle lamp, comprising:

a lamp frame, the lamp frame defining an outer contour of the vehicle lamp and having an opening;

a light source; and a light guide comprising an elongated body, the body having a light exit segment for guiding light from a light source to exit in a target direction, the light exit segment comprising a bend segment; and a wing-like part, the wing-like part being at least connected to the bend segment and being configured to fill a gap between the bend segment and an edge of the opening, wherein the wing-like part:

is joined to a non-light-exit side of the bend segment and is oriented to emit light in substantially the same direction as the target direction, and has a light exit surface and a back surface opposite the light exit surface, the back surface being provided with a light extraction structure, the light extraction structure being configured to guide light propagated in the wing-like part to exit from the light exit surface; and wherein at least a part of the light guide being installed in the opening, and the light guide being configured to receive light from the light source and guide the received light to exit in a target direction.

12. Motor vehicle, having the vehicle lamp according to claim 11.

13. Vehicle lamp according to claim 11, wherein the light guide further comprises a fixing part, the fixing part being connected to a side of the wing-like part which is away from the body to fix the light guide to the lamp frame.

14. Vehicle lamp according to claim 11, wherein the light exit segment has a substantially constant cross-sectional size.

15. Vehicle lamp according to claim 11, wherein the body also has a first end and a second end opposite each other, at least one of the first and second end being defined with a light entry surface, the light entry surface being configured to receive light from the light source, such that the received light is propagated in the body to the light exit segment.

16. Vehicle lamp according to claim 11, wherein the body comprises one tubular or rod-like light guide element, or comprises at least two tubular or rod-like light guide elements arranged side by side.

* * * * *